Feb. 18, 1958 H. P. ANGEL 2,823,710
SWING SAW CONSTRUCTION WITH STRAIGHT LINE MOTION
Filed Oct. 10, 1955
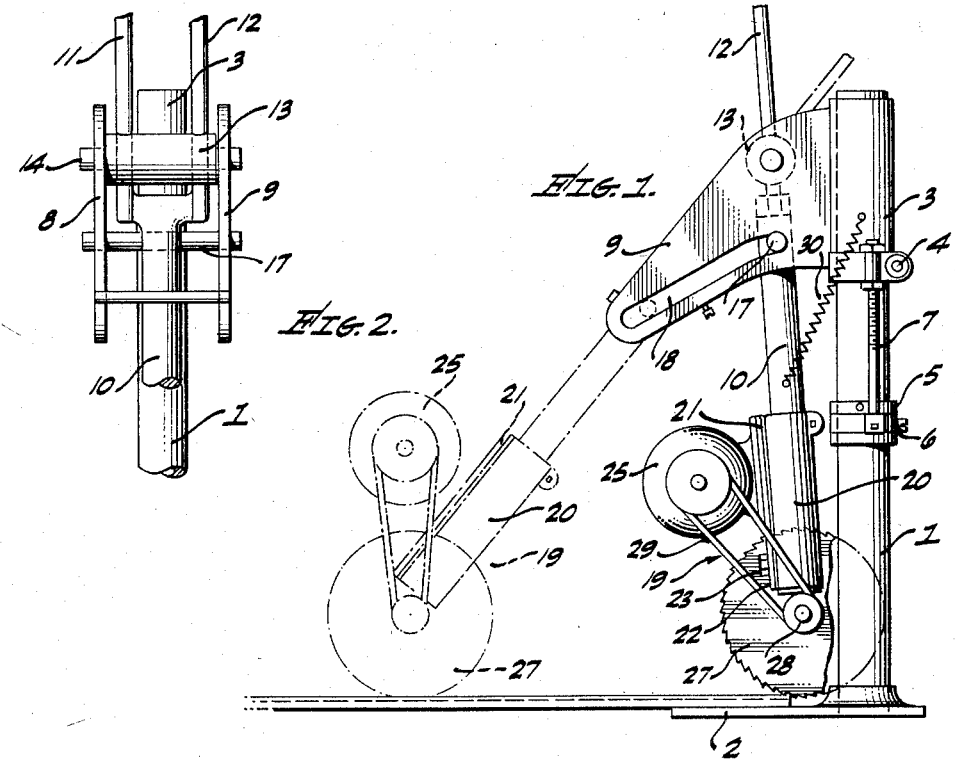
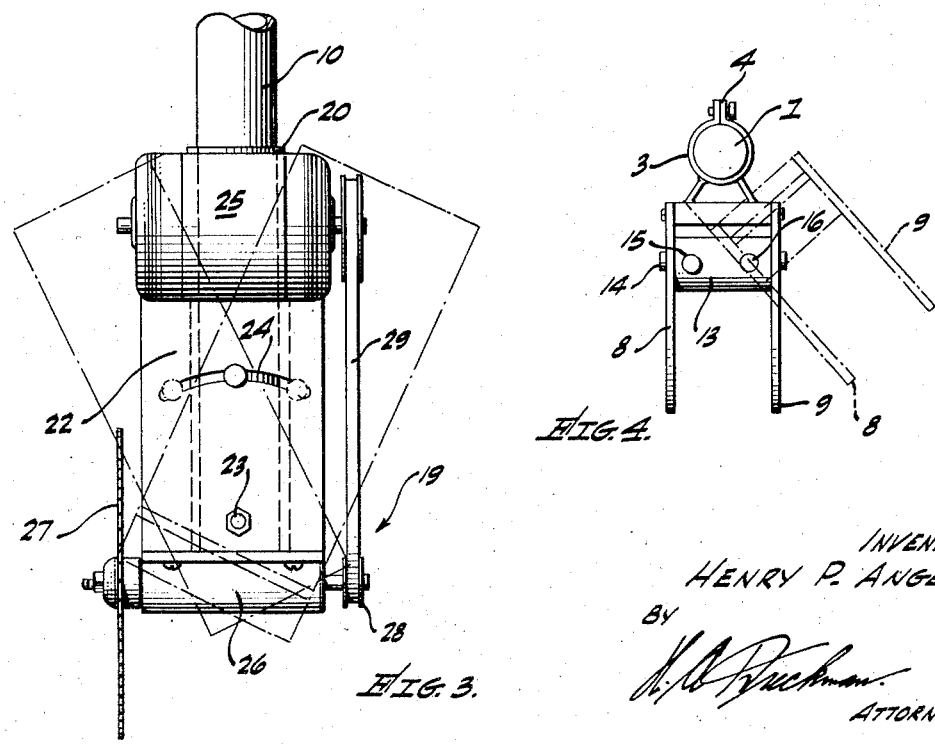
INVENTOR.
HENRY P. ANGEL.
BY
ATTORNEY.

United States Patent Office 2,823,710
Patented Feb. 18, 1958

2,823,710

SWING SAW CONSTRUCTION WITH STRAIGHT LINE MOTION

Henry P. Angel, Compton, Calif.

Application October 10, 1955, Serial No. 539,401

5 Claims. (Cl. 143—46)

This invention relates to a swing saw construction whereby a saw is caused to move in a horizontal plane throughout the entire length of its movement.

An object of my invention is to provide a novel swing saw construction in which the saw can be moved vertically to vary the depth of the cut.

Another object of my invention is to provide a novel swing saw construction with straight line motion in which the saw can be angularly moved to permit angular cuts to be made on a board, and also the saw can be tilted through a vertical angle and the saw still will cut in a true horizontal plane.

Another object of my invention is to provide a novel swing saw construction with straight line motion in which a cut of greater width is obtained than in saws heretofore in use.

Other objects, advantages and features of invention may appear from the accompanying drawing, the subjoined detailed description and the appended claims.

In the drawing—

Figure 1 is a side elevation of my swing saw construction.

Figure 2 is a fragmentary front view showing the saw supporting post and its mount.

Figure 3 is a front elevation of the saw mount and drive.

Figure 4 is a top plan view of the supporting column and the guide head.

Referring more particularly to the drawing, the numeral 1 indicates a supporting column which rises vertically from the attachment plate 2. The plate 2 is fixedly secured to a bench, table, or the like, which supports the entire swing saw. A head 3 is mounted on the upper end of the column 1 and this head is clamped to the column by means of a circular clamp 4 so that the clamp may be securely fastened in its various positions, as will be subsequently described. A collar 5 which may include upper and lower washers is mounted on the column 1 and this collar assembly is fixedly secured to the column by means of a set screw or the like 6. By loosening the set screw the collar may be moved vertically on the column for the purpose of adjusting the head 3 on the column. A threaded rod 7 rises from the collar 5 and extends through the clamp 4, and adjusting nuts on the rod 7 will permit the head 3 to be moved relative to the collar 5. Also the collar 5 can be moved vertically by releasing the set screw 6. The head 3 is provided with two plates 8—9 which project outwardly therefrom. These plates may be an integral part of the head 3, or they may be bolted thereto, whichever is the most desirable. The plates 8 and 9 act to guide the saw in its horizontal movement, as will be subsequently described.

A post 10, which will be termed the saw post, is provided with a pair of spaced pins 11—12 at its upper end. These pins are maintained in fixed relation to the post 10 and may be an integral part of the post, or may be fixedly secured to a suitable fitting at the upper end of the post. A slide fitting 13 is rotatably mounted between the plates 8—9 on trunnions 14—14. These trunnions project through the plates 8—9 and are journaled therein. The slide fitting 13 is provided with two spaced holes 15—16 therein through which the pins 11—12, respectively, extend. Thus the post 10 is free to move vertically with relation to the fitting 13 but it cannot rotate due to the two spaced pins 11—12. A guide rod 17 projects horizontally from the post 10 and this rod extends into a guide slot 18 in each of the plates 8 and 9. The slots 18 are so shaped that the movement of the rod 17 therein will accurately maintain the lower end of the post 10 in a horizontal plane and causing the pins 11—12 to slide upwardly or downwardly through the fitting 13.

The saw assembly 19 is mounted on the lower end of the post 10 and consists of the following: A sleeve 20 is clamped to the lower end of the post 10 by means of the usual type of split clamp and a mounting plate 21 is provided on one side of the sleeve 20. A second plate 22 is adjustably mounted on the plate 21 by means of the pivot stud or bolt 23 and a set screw which extends through the slot 24 in the plate. An electric motor 25 is fixedly mounted on the plate 22 and at the lower end of this plate an arbor bearing 26 is mounted. A saw 27 is attached to one end of the arbor shaft and a pulley 28 is attached to the other end thereof. The belt 29 extends from the motor 25 to the pulley 28 to drive the saw 27. By rotating the plate 22 around the pivot 23 it is possible to change the angularity of the saw 27, permitting miter cuts to be made.

The post 10 is urged towards the column 1 by means of a coil spring 30, one end of the spring being attached to the head 3 and the other end to the post 10. Thus the entire saw assembly is always held in a position adjacent the column 1 when not in use.

In operation, the column 1 is bolted to a bench or table by means of the attachment plate 2. The board which is to be sawed is placed on this bench or table after the saw 27 is pulled outwardly to the dotted line position in Figure 1. The saw is then moved inwardly to the solid line position in Figure 1 to sever the board. The saw 27 in moving from the dotted line position to the solid line position moves in a true horizontal plane, due to the shape of the slots 18 which move the post 10 upwardly as the saw 27 moves towards the column 1. The post 10 is also accurately guided in its vertical sliding movement by the pins 11—12 which slide in the fitting 13 which is rotatably mounted between the plates 8 and 9. The saw 27 can be adjusted relative to the bench or table top by moving the head 3 on the column 1, and this is accomplished by screwing adjusting nuts on the rod 7 up or down on the rod and relative to the collar 5. Also the collar 5 can be adjusted on the column 1. The saw 27 can also be rotated with relation to the post 10 by moving or rotating the sleeve 20 on the post 10. Also the saw 27 can be angularly adjusted relative to the longitudinal center line of the post 10 by swinging or adjusting the second plate 22 around the bolt 23, thus enabling the saw to make a miter or angular cut. The saw 27 is urged towards the column 1 by a suitable spring means.

Having described my invention, I claim:

1. A swing saw construction comprising a vertical column, a head mounted on said column, a pair of elongated, horizontally spaced plates in parallel, normally vertical planes extending horizontally from said head, each of said plates having a cam slot therein extending lengthwise of the plates, a post, a guide rod projecting horizontally from the post and extending into said cam slots, a fitting, means rotatably mounting said fitting between the plates on a normally horizontal axis, a pin extending upwardly from and rigidly attached to said post and slidable in the fitting, saw mounting means on the lower end of the post, said mounting means including a motor, an arbor normally parallel to said axis and guide rod, a saw journaled on the arbor, and drive means extending from the motor to the saw, said cam slots being shaped so that the saw arbor travels laterally in a straight horizontal line as the post is swung.

2. A swing saw construction comprising a vertical column, a head mounted on said column, said head being adjustable vertically on the column, and means engaging the head securing said head on the column, a pair of elongated, horizontally spaced plates in parallel, normally vertical planes extending horizontally from said head, each of said plates having a cam slot therein extending lengthwise of the plates, a post, a guide rod projecting horizontally from the post and extending into said cam slots, a fitting, means rotatably mounting said fitting between the plates on a normally horizontal axis, a pin extending upwardly from and rigidly attached to said post and slidable in the fitting, a saw mounting means on the lower end of the post, said mounting means including a motor, an arbor normally parallel to said axis and guide rod, a saw journaled on the arbor, and drive means extending from the motor to the saw, said cam slots being shaped so that the saw arbor travels laterally in a straight horizontal line as the post is swung.

3. A swing saw construction comprising a vertical column, a head mounted on said column, a pair of elongated, horizontally spaced plates in parallel, normally vertical planes extending horizontally from said head, each of said plates having a cam slot therein extending lengthwise of the plates, a post, a guide rod projecting horizontally from the post and extending into said camslots, a fitting, means rotatably mounting said fitting between the plates on a normally horizontal axis, a pin extending upwardly from and rigidly attached to said post and slidable in the fitting, saw mounting means on the lower end of the post, said mounting means being rotatable on the post, and means clamping said mounting means on the post, said mounting means including a motor, an arbor normally parallel to said axis and guide rod, a saw journaled on the arbor, and drive means extending from the motor to the saw, said cam slots being shaped so that the saw arbor travels laterally in a straight horizontal line as the post is swung.

4. A swing saw construction comprising a vertical column, an attachment plate on the lower end of the column, a head mounted on the upper end of said column, clamping means on the head whereby the head is fixedly securable to the column, a collar, means adjustably securing the collar to the column, threaded means extending from the collar to said head to adjust the head vertically relative to the collar and on the column, a pair of elongated, horizontally spaced plates in parallel, normally vertical planes extending horizontally from said head, each of said plates having a cam slot therein extending lengthwise of the plates, a post, a guide rod projecting horizontally from the post and extending into said cam slots, a fitting, means rotatably mounting said fitting between said plates on a normally horizontally axis, a pin extending upwardly from and rigidly attached to said post and slidable in the fitting, saw mounting means on the lower end of the post, said mounting means including a motor, an arbor normally parallel to said axis and guide rod, a saw journaled on the arbor, and drive means extending from the motor to the saw, said cam slots being shaped so that the saw arbor travels laterally in a straight horizontal line as the post is swung.

5. A swing saw construction comprising a vertical column, an attachment plate on the lower end of the column, a head mounted on the upper end of said column, clamping means on the head whereby the head is fixedly securable to the column, a collar, means adjustably securing the collar to the column, threaded means extending from the collar to said head to adjust the head vertically relative to the collar and on the column, a pair of elongated, horizontally spaced plates in parallel, normally vertical planes extending horizontally from said head, each of said plates having a cam slot therein extending lengthwise of the plates, a post, a guide rod projecting horizontally from the post and extending into said cam slots, a fitting, means rotatably mounting said fitting between said plates on a normally horizontal axis, a pin extending upwardly from and rigidly attached to said post and slidable in the fitting, saw mounting means on the lower end of the post, said saw mounting means including a plate, means rotatably mounting said plate on the post, a motor mounted on said plate, an arbor normally parallel to said axis and guide rod mounted on said plate, a saw journaled on the arbor, and drive means extending from the motor to the saw, said cam slots being shaped so that the saw arbor travels laterally in a straight horizontal line as the post is swung.

References Cited in the file of this patent

UNITED STATES PATENTS

| Number | Name | Date |
|---|---|---|
| 396,218 | Mackintosh | Jan. 15, 1889 |
| 1,638,086 | Carter | Aug. 9, 1927 |
| 2,258,828 | Trebert | Oct. 14, 1941 |
| 2,302,356 | Taylor | Nov. 17, 1942 |
| 2,546,277 | Schwandt | Mar. 27, 1951 |
| 2,551,130 | Hunt et al. | May 1, 1951 |

FOREIGN PATENTS

| Number | Country | Date |
|---|---|---|
| 691,648 | Germany | June 1, 1940 |